3,244,713
NOVEL HYDROXYALKYL SUBSTITUTED S-TRIAZINES
Rostyslaw Dowbenko and Roger M. Christenson, Gibsonia, Pa., assignors to Pittsburgh Plate Glass Company, Pittsburgh, Pa., a corporation of Pennsylvania
No Drawing. Filed Feb. 26, 1963, Ser. No. 261,223
8 Claims. (Cl. 260—249.9)

This invention relates to novel hydroxy substituted triazines and to the preparation thereof. More particularly this invention pertains to compounds of the formula (1)
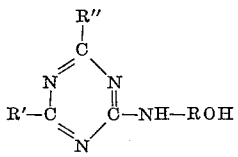

wherein R is an alkylene, alkyleneoxyalkyl or alkylene group, preferably containing one to ten carbon atoms, and R' and R'' are members of the class consisting of hydrogen, amino, alkyl, aryl, alkaryl, arylalkyl, alkenyl, alkoxyalkyl, alkylamino, arylamino, alkarylamino, arylalkylamino and —NH—ROH groups, wherein the hydrocarbon portion of any group preferably contains one to ten carbon atoms.

Many of the compounds of Formula 1 are novel. These novel compounds have the structure (2)
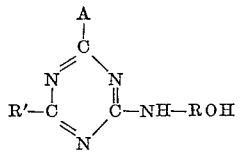

wherein R and R' have the significance set forth above and A is a member of the class consisting of alkyl, aryl, alkenyl, alkoxyalkyl, alkaryl, arylalkyl and —NH—ROH groups wherein the hydrocarbon portion of any group preferably contains one to ten carbon atoms.

The compounds represented by Formula 1 above are prepared by reacting a triazine having the structure (3)
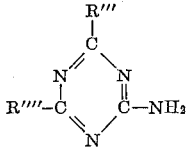

wherein R''' and R'''' are members of the class consisting of hydrogen, amino, alkyl, aryl, alkaryl, arylalkyl, alkenyl, alkoxyalkyl, alkylamino, arylamino, alkarylamino and arylalkylamino groups, wherein the hydrocarbon portion of any group preferably contains one to ten carbon atoms, with an alkanolamine having the structure (4) 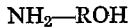 NH₂—ROH wherein R has the significance set forth hereinabove in the presence of a hydrogen halide, said hydrogen halide being present as a discrete compound or as the salt of one of the reactants or as the salt of a compound less basic than the alkanolamine reactant.

The reaction is believed to take place substantially as follows, wherein benzoguanamine and ethanolamine are used for illustrative purposes:

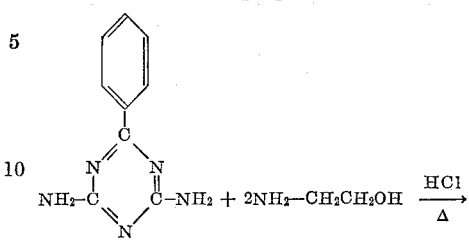

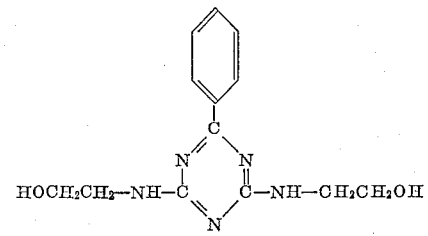

The reaction between a triazine having the structure represented by Formula 3, above, and an alkanolamine having the structure represented by Formula 4, above, occurs whenever these reactants are brought into effective contact at a temperature of about 120° C., or lower, to about 250° C., or higher, in the presence of a hydrogen halide. While the said reaction proceeds readily at these temperatures, one preferred method of conducting the reaction is to heat the reactants to the boiling point of the alkanolamine reactant thence conducting the reaction under reflux conditions. The boiling points of typical alkanolamines such as ethanolamine and 3-amino-1-propanol are, respectively, 170.5° C. and 168° C. Conducting the reaction under reflux conditions is an advantageous method of maintaining a constant reaction temperature. This method of temperature control can be further utilized by varying the reaction pressure. Thus, by use of subatmospheric or superatmospheric pressures the reaction temperature under reflux conditions may be lowered or raised as desired.

Another method of maintaining a constant reaction temperature at various temperatures within the indicated reaction temperature range is by the use of a solvent which dissolves both reactants. The reaction is then conducted under reflux conditions at the boiling point of the said solvent, if the boiling point of the solution is less than the boiling point of the alkanolamine reactant, which boiling point may be varied by varying the reaction pressure. Some suitable solvents for this purpose are:

A. Alcohol-type solvents: n-Amyl alcohol, sec-amyl alcohol, 2-methyl-1-butanol, n-hexyl alcohol, 2-ethyl-1-butanol, n-heptyl alcohol, 3-heptanol, n-octyl alcohol, 2-heptanol, 2-ethyl-1-hexanol, n-decyl alcohol, 2-methyl-2,4-pentanediol and the like.

B. Ether-type solvents: Diethylene glycol diethyl ether, diethylene glycol dimethyl ether, diethylene glycol dibutyl ether, diethylene glycol monomethyl ether, diethylene glycol monoethyl ether, diethylene glycol monobutyl ether, triethylene glycol monomethyl ether, triethylene glycol dimethyl ether, ethylene glycol diethyl ether, ethylene glycol monoethyl ether, ethylene glycol monobutyl ether, ethylene glycol dibutyl ether and the like.

Other mutual solvents, i.e., a solvent which solubilizes both reactants, which have an atmospheric or superatmospheric boiling point that is preferably not below about 120° C. may be utilized. The reaction can also be carried out in the presence of diluents.

In preparing hydroxyl substituted triazines of the type represented by Formula 1, above, from a triazine and an alkanolamine, an excess of either reactant may be utilized. A convenient method of conducting the reaction involves the use of an excess of the alkanolamine reactant which acts as a solvent for the triazine reactant, thereby insuring effective contact between the reactants. An excess of the alkanolamine is therefore advantageous insomuch as no additional solvents are then required to obtain effective contact between reactants. When an excess of the triazine reactant is utilized it is generally desirable to utilize a solvent such as one of the mutual solvents listed hereinabove.

As mentioned above, the novel process of this invention requires the presence of a hydrogen halide. The preferred hydrogen halides for this purpose are hydrogen chloride and hydrogen bromide, although the other hydrogen halides may be used. The hydrogen halide may be introduced into the process as the salt of one of the reactants, as a gas, or as the salt of a compound less basic than the alkanolamine reactant, such as ammonium chloride.

The exact mechanism of the reaction is not known, however, it is believed that salt formation of the reactants with a hydrogen halide is extremely rapid and that prior to any reaction between reactants a small amount of a hydrogen halide salt of one, or both, of the reactants is present. One of the preferred methods of introducing the hydrogen halide into the process, therefore, is as the salt of one of the reactants. Such salts of the reactants of the instant invention are easily prepared by heating an aqueous solution of a hydrogen halide, such as hydrochloric acid, with the desired reactant. The following examples more particularly describe the preparation of hydrogen halide salts of the reactants:

EXAMPLE A.—*Preparation of benzoguanamine hydrochloride*

Eight hundred milliliters of concentrated hydrochloric acid and 1600 milliliters of water were admixed with 747 grams of benzoguanamine. The mixture was heated at about 100° C. for about one-half hour, then cooled and filtered. The filter cake was washed with cold water and dried. Nine hundred and thirteen grams of benzoguanamine hydrochloride having a melting point of 244 to 248° C. were obtained.

EXAMPLE B.—*Preparation of ethanolamine hydrochloride*

Dry hydrogen chloride was added, with cooling, to a solution of 200 grams of ethanolamine in 400 milliliters of methanol until the mixture became saturated. Ether was added and the ethanolamine hydrochloride precipitated. Three hundred eleven and nine-tenths grams of ethanolamine hydrochloride were recovered as a white solid having a melting point of 85 to 87° C.

In a typical reaction between a triazine hydrochloride and an alkanolamine, e.g., benzoguanamine hydrochloride and ethanolamine, wherein an excess of ethanolamine is used as a solvent for the triazine hydrochloride, ammonia is evolved and a viscous reaction product is formed. The reaction product may be recovered by removing any excess alkanolamine by vacuum evaporation, then dissolving the residual material in an appropriate solvent, such as water or an alkyl alcohol and crystallizing the product by cooling or other means. The crystalline reaction product can be recovered by filtration or total evaporation of the solvent.

The product as recovered at this stage is a relatively pure compound and can be reacted with carboxyl containing compounds to form esters, and in instances where the reaction product is a polyhydroxyl compound, to form polyesters with dibasic carboxylic acids. Reactions with formaldehyde can also take place, thereby forming a methylolated hydroxy substituted compound. If further purification is desired the reaction product can be recrystallized from an appropriate solvent such as water or an alkyl alcohol, or mixtures thereof, and recovered by filtration. Other methods of recovery and purification are also utilizable; however, the crystallization method is preferred.

The recovery and purification techniques described above are utilizable to recover and purify either polyhydroxy substituted triazines or monohydroxy substituted triazines.

The novel reaction method of this invention to produce hydroxy substituted triazines can be substantially controlled to yield a reaction product containing either (a) a monohydroxy substituted compound with only negligible amounts of polyhydroxy substituted compounds or (b) a polyhydroxy substituted compound with only negligible amounts of a monohydroxy substituted compound. It has been discovered that by varying the concentration of the hydrogen halide in respect to the triazine reactant the character of the reaction product can be varied.

For example, when a hydrogen halide is present in a minor amount, i.e., about 0.025 to about 0.10 mole of hydrogen halide per mole of triazine reactant, the predominant compound formed is a monohydroxy substituted triazine. When a hydrogen halide is present in a major amount, i.e., about 0.5 mole, or less to about 2.0 moles, or more, per mole of triazine reactant, the predominant compound formed is a polyhydroxy substituted triazine. To illustrate this advantageous feature of the novel process of this invention reference is made to Example I below, wherein N,N'-bis(2-hydroxyethyl)benzoguanamine dihydrate was the predominant compound formed from the reaction between 0.2 mole of benzoguanamine and excess ethanolamine in the presence of 0.2 mole of hydrogen chloride (present as the salt of benzoguanamine), and to Example II below wherein N-(2-hydroxyethyl)benzoguanamine was the predominant compound formed from the reatcion between 0.2 mole of benzoguanamine and excess ethanolamine in the presence of 0.02 mole of hydrogen chloride (present as the salt of benzoguanamine).

While the above described feature of this invention is particularly desirable insomuch as relatively pure compounds can be obtained without resorting to separation techniques, the operation of the novel process in such a manner as to produce mixtures of monohydroxy and polyhydroxy substituted triazines is extremely useful also insomuch as the separation of these compounds is not imposingly difficult and, for certain purposes, such as the preparation of polyester resins or urethane foams a mixture of said hydroxy compounds is readily utilizable, and in some instances, preferred.

The separation of pure monohydroxy and/or polyhydroxy substituted triazines, if desired, from a mixture of said compounds can be accomplished by selective crystallization from a mutual solvent or in some instances by vacuum distillation.

Some amino-s-triazines having the structure represented by Formula 3 above, and utilizable as one of the reactants in the instant invention include:

Monoamino-s-triazine
2,4-diamino-s-triazine
2-methyl-4-amino-s-triazine
2-propyl-4-amino-s-triazine
2-hexyl-4-amino-s-triazine
2-decyl-4-amino-s-triazine
2-phenyl-4-amino-s-triazine
2-(o-tolyl)-4-amino-s-triazine
2-(p-butylphenyl)-4-amino-s-triazine
2-benzyl-4-amino-s-triazine 2-phenylpropyl-4-amino-s-triazine
2-methylamino-4-amino-s-triazine
2-butylamino-4-amino-s-triazine
2-hexylamino-4-amino-s-triazine
2-decylamino-4-amino-s-triazine
2-phenylamino-4-amino-s-triazine
2-(m-tolylamino)-4-amino-s-triazine
2-(p-butylphenylamino)-4-amino-s-triazine
2-phenylethylamino-4-amino-s-triazine
2-phenylbutylamino-4-amino-s-triazine
Melamine
2-methyl-4,6-diamino-s-triazine
2-amyl-4,6-diamino-s-triazine
2-heptyl-4,6-diamino-s-triazine
2-decyl-4,6-diamino-s-triazine
Benzoguanamine
2-(p-tolyl)-4,6-diamino-s-triazine
2-(m-propylphenyl)-4,6-diamino-s-triazine
2-phenylpropyl-4,6-diamino-s-triazine
2-methylamino-4,6-diamino-s-triazine
2-butylamino-4,6-diamino-s-triazine
2-octylamino-4,6-diamino-s-triazine
2-decylamino-4,6-diamino-s-triazine
2-phenylamino-4,6-diamino-s-triazine
2-(o-tolylamino)4,6-diamino-s-triazine
2-(p-propylphenylamino)-4,6-diamino-s-triazine
2-phenylpropyl-4,6-diamino-s-triazine
2,4-dimethyl-6-amino-s-triazine
2,4-dihexyl-6-amino-s-triazine
2-ethyl-4-phenyl-6-amino-s-triazine
2-octyl-4-phenyl-6-amino-s-triazine
2-propyl-4-(o-tolyl)-6-amino-s-triazine
2-amyl-4-benzyl-6-amino-s-triazine
2-hexyl-4-methylamino-6-amino-s-triazine
2-octyl-4-propylamino-6-amino-s-triazine
2-decyl-4-phenylamino-6-amino-s-triazine
2-methyl-4-(p-propylphenylamino)-6-amino-s-triazine
2-ethyl-4-(phenylamylamino)-6-amino-s-triazine
2,4-diphenyl-6-amino-s-triazine
2-phenyl-4-(m-tolyl)-6-amino-s-triazine
2-phenyl-4-phenylethyl-6-amino-s-triazine
2-phenyl-4-methylamino-6-amino-s-triazine
2-phenyl-4-phenylamino-6-amino-s-triazine
2-phenyl-4-(benzylamino)-6-amino-s-triazine
2-(o-tolyl)-4-(p-tolyl)-6-amino-s-triazine
2-(p-ethylphenyl)-4-phenylpropyl-6-amino-s-triazine
2-(m-butylphenyl)-4-butylamino-6-amino-s-triazine
2-(o-amylphenyl)-4-phenylamino-6-amino-s-triazine
2-(p-hexylphenyl)-4-(o-tolylamino)-6-amino-s-triazine
2-(m-propylphenyl)-4-benylamino-6-amino-s-triazine
2,4-dibenzyl-6-amino-s-triazine
2-phenylethyl-4-methylamino-6-amino-s-triazine
2-phenylpropyl-4-phenylamino-6-amino-s-triazine
2-phenylbutyl-4-(o-ethylphenylamino)-6-amino-s-triazine
2-phenylethyl-4-phenylpropylamino-6-amino-s-triazine
2-methylamino-4-ethylamino-6-amino-s-triazine
2-ethylamino-4-phenylamino-6-amino-s-triazine
2-butylamino-4-(o-tolylamino)-6-amino-s-triazine
2-hexylamino-4-(o-ethylphenylamino)-6-amino-s-triazine
2-octylamino-4-benzylamino-6-amino-s-triazine
2,4-di(phenylamino)-6-amino-s-triazine
2-phenylamino-4-(o-tolylamino)-6-amino-s-triazine
2-phenylamino-4-(o-butylphenylamino)-6-amino-s-triazine
2-naphthylamino-4-benzylamino-6-amino-s-triazine
2-(o-tolylamino)-4-(o-propylphenylamino)-6-amino-s-triazine
2-(p-propylphenylamino)-4-benzylamino-6-amino-s-triazine
2-(m-phenylethylamino)-4-benzylamino-6-amino-s-triazine
2-vinyl-4-amino-s-triazine
2-allyl-4,6-diamino-3-triazine
2-(2-butenyl)-4-propyl-6-amino-s-triazine
2,4-divinyl-6-amino-s-triazine
2-methoxymethyl-4-amino-s-triazine
2-ethoxyethyl-4,6-diamino-s-triazine
2-propoxymethyl-4-butyl-6-amino-s-triazine
2-pentoxypentyl-4-pentyl-6-amino-s-triazine
2,4-di(butoxybutyl)-6-amino-s-triazine
and the like.

The following alkanolamines are illustrative of compounds represented by Formula 4 above, and utilizable in the above described process.

Ethanolamine
2-amino-1-propanol
2-amino-1-butanol
5-amino-3-pentanol
6-amino-1-hexanol
8-amino-1-octanol
3-amino-1-pentene-5-ol
4-amino-2-hexene-6-ol
2-amino-3-methoxy-1-propanol
3-amino-5-ethoxy-1-pentanol
4-amino-7-methoxy-2-heptanol
3-amino-1-propanol
4-amino-1-butanol
5-amino-1-pentanol
3-amino-2-pentanol
4-amino-2-hexanol
10-amino-1-decanol
3-amino-1-hexene-5-ol
5-amino-2-octene-6-ol
and the like.

Hydroxy substituted triazines illustrated by Formula 1, above, which can be prepared by the methods outlined above include the following:

2-(2-hydroxyethyl)amino-s-triazine
2-(3-hydroxypropyl)amino-s-triazine
2-(5-hydroxyamyl)amino-s-triazine
2-(2-hydroxypropyl)amino-4-amino-6-(o-tolyl)-s-triazine
2-(2-hydroxyethyl)amino-4-amino-6-(3-ethylphenyl)-s-triazine
2-(3-hydroxybutyl)amino-4-amino-6-(2,4-xylyl)-s-triazine
2-(2-hydroxyethyl)amino-4,6-diamino-s-triazine
2-(2-hydroxyethyl)amino-4,6-di(methylamino)-s-triazine
2-(3-hydroxypropyl)amino-4,6-di(phenylamino)-s-triazine
2-(2-hydroxyethyl)amino-4-propylamino-6-amino-s-triazine
2-(2-hydroxypropyl)amino-4-hexylamino-6-amino-s-triazine
2-(4-hydroxybutyl)amino-4-amylamino-6-(o-tolyl)-amino-s-triazine
2-(3-hydroxybutyl)amino-4,6-di(butylamino)-s-triazine
N,N'-bis(2-hydroxyethyl)formoguanamine
N,N'-bis(2-hydroxypropyl)acetoguanamine
N,N'-bis(2-hydroxyethyl)propioguanamine
N,N'-bis(3-hydroxypropyl)benzoguanamine
N,N'-bis(4-hydroxybutyl)benzoguanamine
2,4-bis[(2-hydroxyethyl)amino]-6-amino-s-triazine
2,4-bis[(2-hydroxypropyl)amino]-6-methylamino-s-triazine
2,4-bis[(2-hydroxybutyl)amino]-6-propylamino-s-triazine
2,4-bis[(3-hydroxypropyl)amino]-6-amylamino-s-triazine
2,4-bis[(3-hydroxybutyl)amino]-6-phenylamino-s-triazine
2,4-bis[(4-hydroxybutyl)amino]-6-(p-tolyl)amino-s-triazine
2,4-bis[(2-hydroxyethyl)amino]-6-(3-propylphenyl)amino-s-triazine 2,4-bis[(2-hydroxypropyl)amino]-6-(2,4-
  xylyl)-amino-s-triazine
2,4,6-tris[(2-hydroxyethyl)amino]-s-triazine
2,4,6-tris[(2-hydroxypropyl)amino]-s-triazine
2,4,6-tris[(3-hydroxypropyl)amino]-s-triazine
2,4,6-tris[(4-hydroxybutyl)amino]-s-triazine
2-(2-vinyl-2-hydroxyethyl)amino-4,6-
  diamino-s-triazine
2-(3-ethoxy-3-hydroxypropyl)amino-4-phenyl-6-
  amino-s-triazine
and the like.

The hydroxy substituted triazines of this invention are especially useful in the preparation of saturated and unsaturated polyesters, alkyd resins and in polyurethane foams. Also, certain diesters of these compounds, such as N,N'-bis(2-acetoxyethyl)benzoguanamine, have been found to be effective nematocides. The dihydroxy and trihydroxy substituted triazines are especially useful for these applications, while the monohydroxy substituted triazines are particularly useful in the preparation of formaldehyde condensation resins which have a residual hydroxy-alkyl group available for further cross-linking. Formaldehyde condensation resins prepared from monohydroxy substituted triazines of the invention are hard, fused and relatively insoluble, and are useful in the preparation of castings, coatings, moldings and the like.

The following examples illustrate in detail the preparation of hydroxy substituted triazines in accordance with this invention. The examples are not intended to limit the invention, however, for there are, of course, numerous possible variations and modifications.

EXAMPLE I

A mixture of 44.6 grams (0.20 gram-mole) of benzoguanamine hydrochloride and 37.2 grams (0.60 gram-mole) of ethanolamine was heated at reflux, about 167° C., for a period of 14 hours in a glass reaction vessel equipped with stirrer, reflux condenser and thermometer. During this period ammonia was evolved.

The excess ethanolamine was recovered from the reaction mixture by vacuum distillation. The resulting reaction product was a viscous liquid weighing 63 grams. It was dissolved in hot water, allowed to crystallize and then filtered. A yield of 36.5 grams of N,N'-bis(2-hydroxyethyl)benzoguanamine dihydrate having a melting point range of 76–79° C. was obtained. Several recrystallizations from hot water and a final recrystallization from a mixture of ethanol and water gave a product having a melting point of 79–80° C. and a composition of: carbon, 50.31 percent; hydrogen, 6.45 percent; nitrogen, 22.65 percent; water, 11.05 percent. This analysis compares favorably with the theoretical composition of N,N-bis(2-hydroxyethyl)benzoguanamine dihydrate

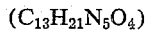

which is as follows: carbon, 50.15 percent; hydrogen, 6.80 percent; nitrogen, 22.50 percent; water, 11.58 percent.

Ethanolamine hydrochloride and benzoguanamine react readily when processed by the above procedure to form N,N'-bis(2-hydroxyethyl)benzoguanamine dihydrate.

EXAMPLE II

A mxture of 36.5 grams (0.19 gram-mole) of benzoguanamine, 2.23 grams (0.01 gram-mole) of benzoguanamine hyldrochloride and 37 grams (0.60 gram-mole) of ethanolamine was heated at 175–180° C. for a period of about 14 hours in a glass reaction vessel equipped with a stirrer, reflux condenser and thermometer. The reaction was accompanied by the evolution of ammonia.

The resulting reaction mixture, which solidified upon cooling, was admixed with water and dissolved by the addition of warm ethanol. The resulting solution was crystallized and filtered to give 38.5 grams of a solid material having a melting point range of 153–165° C. Upon repeated recrystallization from a mixture of ethanol and water a solid product having a melting point of 176–178° C. was obtained. This material had the following composition: carbon, 57.15 percent; hydrogen, 5.74 percent; nitrogen, 30.06 percent; which compares favorably with the calculated composition of N-(2-hydroxyethyl)benzoguanamine ($C_{11}H_{13}N_5O$): carbon, 57.13 percent; hydrogen, 5.66 percent; nitrogen, 30.29 percent.

When 33.6 grams (0.18 gram-mole) of benzoguanamine, 4.45 grams (0.02 gram-mole) of benzoguanamine hydrochloride and 37.0 grams (0.06 gram-mole) of ethanolamine are caused to react by the above procedure, 33 grams of a solid having a melting point range of 137–159° C. were obtained. Recrystallization of this material from aqueous methanol yielded 18.5 grams of N-(2-hydroxyethyl)benzoguanamine, melting point of 173–177° C.

Fifty six and one-tenth (56.1) grams, (0.30 gram-mole) of benzoguanamine, 61.8 grams (1.00 gram-mole) of ethanolamine and 0.5 gram of benzoguanamine hydrochloride were processed in the above manner. The resulting solid reaction product was crystallized from aqueous ethanol and methanol, yielding 13 grams of impure N-(2-hydroxyethyl)benzoguanamine having a melting point range of 130–167° C.

N-(2-hydroxyethyl)acetoguanamine and N-(2-hydroxyethyl)phenylacetoguanamine are produced when acetoguanamine and phenylacetoguanamine are respectively substituted for benzoguanamine; and acetoguanamine hydrochloride and phenylacetoguanamine hydrochloride are respectively substituted for benzoguanamine hydrochloride in the above procedure.

EXAMPLE III

N,N'-bis(2-hydroxyethyl)benzoguanamine was prepared by heating at about 175° C. for about 13 hours a mixture of 25.9 grams (0.10 gram-mole) of N-(2-hydroxyethyl)benzoguanamine (Example II product), 9.8 grams (0.10 gram-mole) of ethanolamine hydrochloride and 12.4 grams (0.20 gram-mole) of ethanolamine. The resulting reaction mixture was solidified by pouring into 100 milliliters of water. Ten grams of a solid material having a melting point range of 60–71° C. was recovered by filtration.

Five and five-tenths (5.5) grams of a solid product having a melting point of 75–77° C. was obtained after several recrystallizations of the reaction mixture from a mixture of water and methanol. The product was identified as N,N'-bis(2-hydroxyethyl)benzoguanamine dihydrate as no melting point depression was observed when some of this compound was mixed with the pure compound of Example I.

Two (2.0) grams of N,N'-bis(2-hydroxyethyl)benzoguanamine dihydrate was dissolved in 25 milliliters of ethanol and admixed with a solution of 1.5 grams of picric acid in 25 milliliters of ethanol. Crystallization occurred immediately and 3.3 grams of a yellow solid having a melting point range of 162–166° C. were recovered by filtration. Repeated recrystallizations from methanol yielded a yellow solid having a melting point of 163–165° C. and a composition of: carbon, 44.88 percent; hydrogen, 4.03 percent; nitrogen, 21.84 percent; which compares favorably with the theoretical composition of N,N'-bis(2-hydroxyethyl)benzoguanamine picrate ($C_{19}H_{20}N_8O_9$): carbon, 45.24 percent; hydrogen, 4.00 percent; nitrogen, 22.22 percent.

EXAMPLE IV

A mixture of 48.5 grams (0.30 gram-mole) acetoguanamine hydrochloride and 55.5 grams (0.90 gram-mole) of ethanolamine was heated at 175–180° C. for 4 hours in a glass reaction vessel equipped with a reflux condenser, stirrer and thermometer.

Most of the ethanolamine was removed by vacuum distillation and the reaction residue was dissolved in water. Twelve (12) grams of a semi-solid material having a melting point range of 95–125° C. were recovered. A white solid having a melting point of 155.5–157° C. was obtained by recrystallizing the semi-solid material several times from water. The white solid material had the following composition: carbon, 42.15 percent; hydrogen, 7.07 percent; nitrogen, 32.21 percent, which compares favorably with the theoretical composition of N,N'-bis(2-hydroxyethyl)acetoguanamine ($C_{16}H_{17}N_5O_2$), which is as follows: carbon, 41.55 percent; hydrogen, 7.41 percent; nitrogen, 30.29 percent.

Ethanolamine hydrochloride and acetoguanamine react readily when processed by the above procedure to form N,N'-bis(2-hydroxyethyl)acetoguanamine.

EXAMPLE V

A mixture of 52.0 grams (0.22 gram-mole) of phenylacetoguanamine hydrochloride and 49.5 grams (0.80 gram-mole) of ethanolamine was heated at about 175° C. for 8 hours in a glass reaction vessel equipped with a reflux condenser, stirrer and thermometer.

The reaction mixture was cooled and diluted with 100 milliliters of water. The reaction product crystallized and 40.5 grams of a solid having a melting point range of 98–109° C. were recovered. Repeated recrystallizations of the reaction product from a mixture of water and methanol yielded a white solid having a melting point of 117–119° C. and a composition of: carbon, 58.03 percent; hydrogen, 6.50 percent; nitrogen, 22.48 percent. The theoretical composition of N,N'-bis(2-hydroxyethyl)phenylacetoguanamine ($C_{14}H_{19}N_5O_2$) is: carbon, 58.11 percent; hydrogen, 6.57 percent; nitrogen, 24.21 percent.

Ethanolamine hydrochloride and phenylacetoguanamine react readily when processed by the above procedure to form N,N'-bis(2-hydroxyethyl)phenylacetoguanamine.

EXAMPLE VI

A mixture of 34 grams (0.27 gram-mole) of melamine, 4.88 grams (0.03 gram-mole) of melamine hydrochloride and 61.1 grams (1.0 gram-mole) of ethanolamine was heated for 14 hours at about 175° C. in a glass reaction vessel equipped with a stirrer, reflux condenser and thermometer.

At the termination of the reaction, the excess ethanolamine was removed from the reaction mixture by vacuum distillation. The residue was crystallized several times from water, yielding a solid having a melting point of 219–223° C. and a composition of: carbon, 35.36 percent; hydrogen, 5.89 percent; nitrogen, 48.89 percent; which compares favorably with the theoretical composition of N-(2-hydroxyethyl)melamine ($C_5H_{10}N_6O$): carbon, 35.29 percent; hydrogen, 5.92 percent; nitrogen, 49.39 percent.

EXAMPLE VII

A mixture of 40.2 grams (0.25 gram-mole) of melamine hydrochloride and 77.4 grams (1.25 gram-moles) of ethanolamine was refluxed at about 175° C. for 12 hours in a glass reaction vessel equipped with a stirrer, reflux condenser and thermometer.

Eighty-one and three-tenths grams of reaction product were recovered by removing the excess ethanolamine by vacuum drying. The reaction product was dissolved in water and passed through an ion exchange column. Fifty-one grams of yellow syrup were obtained upon evaporation of the eluate. Recrystallization of this material from a butanol-methanol mixture gave 9 grams of a solid having a melting point of 100–133° C. Repeated recrystallizations of this solid produced a white solid having a melting point of 132–134° C. and a composition of: carbon, 36.71 percent; hydrogen, 6.47 percent; chlorine, 11.93 percent; Nitrogen, 27.53 percent; which compares favorably with the theoretical composition of N,N',N''-tris(2-hydroxyethyl) melamine hydrochloride ($C_9H_{19}ClN_6O_3$): carbon, 36.37 percent; hydrogen, 6.50 percent; chlorine, 12.03 percent; nitrogen, 28.52 percent.

Ethanolamine hydrochloride and melamine react readily when processed in the above manner to form N,N',N''-tris(2-hydroxyethyl)melamine hydrochloride.

EXAMPLE VIII

A mixture of 44.7 grams (0.20 gram-mole) of benzoguanamine hydrochloride and 45.0 grams (0.60 gram-mole) of 3-amino-1-propanol was heated at about 175° C. for 14 hours in a glass reaction vessel equipped with a stirrer, reflux condenser and thermometer.

The semi-solid reaction mixture was dissolved by adding it to 200 milliliters of water, then heating concurrently with the addition of methanol. The methanol was subsequently removed and a semi-solid product was recovered which, after several washes with water, yielded 39.9 grams of a viscous product having a nitrogen content of 23.0 percent, which compares favorably with the theoretical nitrogen content (23.1 percent) for N,N'-bis(3-hydroxypropyl)benzoguanamine

Four and fifty-five hundredths (4.55) grams of the viscous reaction product, above, dissolved in 50 milliliters of ethanol were admixed with a solution of 3.44 grams of picric acid dissolved in 50 milliliters of ethanol. A precipitate resulted which, after several recrystallizations from methanol, gave a lemon-yellow solid melting at 181–186° C. and having a composition of: Carbon, 46.19 percent; Hydrogen, 4.36 percent; Nitrogen, 21.65 percent. This composition compares favorably with the theoretical composition of N,N'-bis(3-hydroxypropyl)benzoguanamine picrate ($C_{21}H_{24}N_8O_9$): Carbon, 47.36 percent; Hydrogen, 4.54 percent; Nitrogen, 21.05 percent.

The substitution of melamine hydrochloride benzoguanamine hydrochloride in the above process gives N,N'-bis(3-hydroxypropyl)benzoguanamine.

N,N'-bis(3-hydroxypropyl)acetoguanamine and N,N'-bis(3-hydroxypropyl)phenylacetoguanamine are produced when acetoguanamine hydrochloride and phenylacetoguanamine hydrochloride, respectively, are substituted for benzoguanamine hydrochloride in the above procedure.

EXAMPLE IX

A mixture of 35.6 grams (0.19 gram-mole) of benzoguanamine, 2.23 grams (0.10 gram-mole) of benzoguanamine hydrochloride and 45 grams of 3-amino-1-propanol was heated at about 175° C. for 14 hours in a glass reaction vessel equipped with a stirrer, reflux condenser and thermometer.

Thirty-five grams of a solid having a melting point of 166–168° C. were obtained by diluting the reaction product with 200 milliliters of water and filtering. Recrystallization of this solid from methanol yielded a white solid having a melting point of 168–169° C. and a composition of: Carbon, 57.03 percent; Hydrogen, 5.21 percent; Nitrogen, 32.87 percent; which compares favorably with the theoretical composition of N-(3-hydroxypropyl)benzoguanamine ($C_{21}H_{24}N_{10}O$): Carbon, 58.31 percent; Hydrogen, 5.59 percent; Nitrogen, 32.39 percent.

A solution of 4.32 grams (0.01 gram-mole) of the above compound in 50 milliliters of ethanol were admixed with a warm solution of 2.29 grams (0.01 gram-mole) of picric acid in 20 milliliters of ethanol. Precipitation occurred and 4.5 grams of a yellow solid having a melting point of 210–215° C. were recovered by filtration. Repeated recrystallizations of this material from acetone yielded a yellow solid having a melting point of 250–251° C. and a composition of: Carbon, 45.24 percent; Hydrogen, 3.91 percent; Nitrogen, 23.96 percent; which compares favorably with the theoretical composition of N-(3-hydroxypropyl)benzoguanamine picrate ($C_{18}H_{18}N_8O_8$): Carbon, 45.57 percent; Hydrogen, 3.82 percent; Nitrogen, 23.62 percent.

N-(3-hydroxypropyl)acetoguanamine and N-(3-hydroxypropyl)phenylacetoguanamine are produced when acetoguanamine and phenylacetoguanamine are respectively substituted for benzoguanamine, and acetoguanamine hydrochloride and phenylacetoguanamine hydrochloride, respectively, are substituted for benzoguanamine hydrochloride in the above procedure.

EXAMPLE X

Anhydrous N,N'-bis(2-hydroxyethyl)benzoguanamine was prepared by heating N,N'-bis(2-hydroxyethyl)benzoguanamine dihydrate at about 80–100° C. at 1–10 millimeters of Hg pressure until a constant weight was achieved.

The anhydrous compound was reacted with acetic anhydride by heating for about 6 hours at about 120° C. a mixture of 124.5 grams (0.40 gram-mole) of N,N'-bis(2-hydroxyethyl)benzoguanamine, 500 milliliters of acetic anhydride and 10 grams of anhydrous sodium acetate.

After the reaction was complete the excess acetic anhydride and acetic acid were removed by vacuum drying. The reaction residue was then dissolved in acetone and the resulting solution was filtered. The filtrate was diluted with aromatic naphthas and allowed to crystallize. Filtration gave 164 grams of a solid material having a melting point of 82–87° C. Several recrystallizations from the same solvent gave 103 grams of a solid material having a melting point of 91–92° C.

EXAMPLE XI

A mixture of 31.3 grams (0.10 gram-mole) of anhydrous N,N'-bis(2-hydroxyethyl)benzoguanamine, 19.4 grams (0.10 gram-mole) of dimethyl phthalate and 1.0 gram of tetrabutyl titanate was heated at about 180° C. for about 3 hours in a glass reaction vessel equipped with a stirrer, thermometer, reflux condenser and condensation trap. Four and six-tenths (4.6) milliliters of methanol were collected during this heating period.

The temperature was raised to 220° C. for about one-half hour. The system was evacuated to about 25 millimeters of Hg pressure while the temperature was maintained at 220° C. for an additional 2 hours. Twenty-seven and four-tenths grams of a dark resin having a nitrogen content of 17.2 percent were collected. The theoretical nitrogen content for N,N'-bis(2-hydroxyethyl)benzoguanamine polyphthalate is 17.2 percent.

EXAMPLE XII

A mixture of 15.5 grams (0.06 gram-mole) of N-(2-hydroxyethyl)benzoguanamine, 9.1 grams (0.10 gram-mole) of acrylyl chloride, 0.5 gram of di-t-butylphenol and 100 milliliters of ethylene glycol dimethyl ether was stirred for about 16 hours in a glass reaction vessel equipped with a reflux condenser, stirrer and thermometer. The mixture was then heated to about 50° C. for about 12 hours.

The resulting reaction mixture was cooled and upon filtering, 10 grams of a solid having a melting point of 164–167° C. was obtained. Recrystallization from ethanol gave 2.5 grams of a white solid having a melting point of 216–217° C.

The reactions described in the above examples proceed in a similar manner when hydrogen bromide salts are utilized in place of the hydrogen chloride salts disclosed therein.

EXAMPLE XIII

N,N'-bis(2-hydroxyethyl)benzoguanamine, grams __ 10.0
Anhydrous sodium acetate, grams _____ 6.0
Acetic anhydride, milliliters _____ 100.0

The above ingredients were admixed and heated to about 100° C. for about 5 hours.

After cooling the volatile material was removed by evaporation under vacuum. The residue was diluted with water and allowed to stand for a short time. The water was decanted and the semi-solid residue was washed several times with water and then dissolved in methyl alcohol. The solution was washed several times with benzene until only benzene remained as a solvent. A small amount of Skellysolve B (a mixed aliphatic hydrocarbon solvent having a boiling range of 60–78° C.) was added.

After filtration, 1.65 grams of a white solid were recovered having a melting point of 180–185° C. The filtrate contained an oil which was dissolved in a mixture of ether and Skellysolve B, allowed to crystallize and then filtered. The solid filter cake was dissolved in ether and Skellysolve B, recrystallized and filtered. A white solid was recovered which, after several recrystallizations from an ether-Skellysolve B mixture, gave a solid having a melting point of 145–146° C.

Infrared analysis indicated the presence of two carbonyl bands. The composition of the material was found to be: carbon, 58.31 percent; hydrogen, 5.79 percent; and nitrogen, 17.41 percent; which compares favorably with the calculated composition of N,N'-bis(2-acetoxyethyl)benzoguanamine, which is: carbon, 59.0 percent; hydrogen, 6.52 percent; and nitrogen, 18.2 percent.

EXAMPLE XIV

N,N'-bis(2-acetoxyethyl)benzoguanamine was tested as a nematocide in the following manner:

A solution having a concentration of 2.5 percent of N,N'-bis(2-acetoxyethyl)benzoguanamine in ethanol was prepared. A dilution series was prepared.

(1) 0.5 ml. of 2.5 percent solution was added to 9.5 ml. of distilled water to give 10 ml. of 0.125 percent concentration.

(2) 1 ml. of 0.125 solution was added to 9.0 ml. of distilled water to give 10 ml. of 0.0125 percent concentration.

(3) 1 ml. of 0.0125 solution was added to 9.0 ml. of distilled water to give 10 ml. of 0.00125 percent concentration.

(4) 1 ml. of 0.00125 percent solution was added to 9.0 ml. of distilled water to give 10 ml. of 0.000125 percent concentration.

To each dilution is added 0.2 ml. of a nematode suspension containing about 500 to 750 Panagrellus nematodes per milliliter. The final concentration of N,N'-bis(2-acetoxyethyl)benzoguanamine was 0.1 percent, 0.01 percent, 0.001 percent and 0.0001 percent respectively.

At the end of a 24 hour period the following mortality rates were observed:

100 percent for the 0.1 percent concentration.
90 percent for the 0.01 percent concentration.
75 percent for the 0.001 percent concentration.
25 percent for the 0.0001 percent concentration.

No nematocidal activity was observed from a 0.125 percent solution of ethanol in water when tested in a similar manner.

Although specific examples of the invention have been set forth hereinabove, it is not intended that the invention be limited solely thereto, but to include all the variations and modifications falling within the scope of the appended claims.

We claim:

1. A compound of the formula:

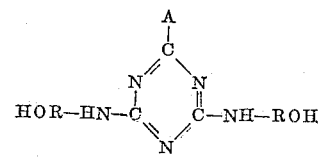

wherein:

A is a member selected from the class consisting of methyl, phenyl, and benzyl and R is alkylene having 2 to 4 carbon atoms.

2. N,N′-bis(2-hydroxyethyl)benzoguanamine.
3. N,N′-bis(3-hydroxypropyl)benzoguanamine.
4. N,N′-bis(2-hydroxyethyl)acetoguanamine.
5. N,N′-bis(3-hydroxypropyl)acetoguanamine.
6. N,N′-bis(2-hydroxyethyl)phenylacetoguanamine.
7. N,N′-bis(3-hydroxypropyl)phenylacetoguanamine.
8. N,N′-bis(2-acetoxyethyl)benzoguanamine.

References Cited by the Examiner

UNITED STATES PATENTS

| | | | | |
|---|---|---|---|---|
| 2,244,421 | 6/1941 | Ericks | 260—249.5 X |
| 2,638,404 | 5/1953 | Millson et al. | 260—249.9 X |
| 2,816,865 | 12/1957 | Rider et al. | 260—249.9 X |
| 2,891,855 | 6/1959 | Gysin et al. | 260—249.8 X |
| 2,892,810 | 6/1959 | Albrecht | 260—249.9 X |
| 2,909,420 | 10/1959 | Gysin et al. | 260—249.9 X |
| 3,096,147 | 7/1963 | Fulmer | 260—249.9 X |

OTHER REFERENCES

Smolin et al.: "S-Triazines and Derivatives," Interscience Pub., Inc., New York (1959), pp. 236, 344–346.

WALTER A. MODANCE, *Primary Examiner.*

NICHOLAS S. RIZZO, JOHN D. RANDOLPH,
*Examiners.*

MARION W. WESTERN, J. M. FORD,
*Assistant Examiners.*